United States Patent [19]

Takagi et al.

[11] Patent Number: 4,519,064

[45] Date of Patent: May 21, 1985

[54] OPTICAL RECORD DISC

[75] Inventors: Toshihiko Takagi; Yoshikazu Kobayashi, both of Kawasaki; Yoshiji Suzuki; Tsutomu Hara, both of Hamamatsu, all of Japan

[73] Assignee: Nippon Columbia Kabushikikaisha, Tokyo, Japan

[21] Appl. No.: 313,764

[22] Filed: Oct. 22, 1981

[30] Foreign Application Priority Data

Oct. 27, 1980 [JP] Japan ................................ 55-150382
May 21, 1981 [JP] Japan ................................ 56-77100

[51] Int. Cl.³ .............................................. G11B 7/24
[52] U.S. Cl. .................................... 369/275; 369/111
[58] Field of Search ....................... 369/111, 225, 109; 358/342; 346/76 L, 135.1, 137

[56] References Cited

U.S. PATENT DOCUMENTS

| 4,023,185 | 5/1977 | Bloom et al. | 369/275 |
| 4,097,895 | 6/1978 | Spong | 369/275 |
| 4,230,939 | 10/1980 | de Bont et al. | 346/135.1 |
| 4,270,130 | 5/1981 | Houle et al. | 346/135.1 |
| 4,290,075 | 9/1981 | Jacobs et al. | 369/275 |
| 4,326,282 | 4/1982 | Verboom et al. | 369/275 |
| 4,336,545 | 6/1982 | Howe et al. | 346/135.1 |
| 4,340,655 | 7/1982 | Hollister et al. | 369/275 |

OTHER PUBLICATIONS

Research Disclosure, Nov. 1978, pp. 38-41, "Medium for Recording by Thermal Deformation".

Primary Examiner—Donald E. McElheny, Jr.
Attorney, Agent, or Firm—Murray Schaffer

[57] ABSTRACT

An optical record disc is provided having a guide signal pit previously formed on a base plate for reading out a tracking information by a laser beam. A reflection film is coated on the base plate including the guide signal pit portion, and the record blank portion. A record layer of a removing type is formed over the reflection film. The record layer has a uniform thickness over the record layer and a uniform thickness, of substantially smaller dimension over the guide signal pit portion.

8 Claims, 7 Drawing Figures

OPTICAL RECORD DISC

BACKGROUND OF THE INVENTION

1. Field of the Invention

The present invention relates generally to an optical record disc, and is directed more particularly to an optical record disc of a removing type in which the recording is made in such a manner that its record layer is vaporized or molten away by the heat energy of light or laser beam incident thereon.

2. Description of the Prior Art

As shown in FIG. 1, an example of the prior art optical record disc is formed of a substrate or base plate 101 and a recording layer 102 made of a thin metal film coated on the base plate 101. In this case, concave and convex portions are formed on the base plate 101 in a guide signal region 110, the concave portion is used as a guide signal pit 106. An information pit 104 is formed on the recording layer 102 in an information record region 111 by, for example, a laser beam 103. The above prior art optical record disc is rather low in record sensitivity. That is, in the art the record layer is made of metal such as bismuth Bi, tellurium Te or of similar thin film since it is highest in record sensitivity. Further, in order to improve the record sensitivity and the absorption power for laser beam the recording layer is formed as a multi-layer. In the prior art, however, the record energy of 100 to 30 mJ/cm$^2$ is required, and for the data record of 10 Mbit/sec a laser light source of the output power more than 20 mW is a practical necessity. A gas laser light source can produce the about output sufficiently, but in this case it is necessary to give information to the laser beam by using an expensive optical modulator. While, if a semiconductor laser which can be directly modulated and has a practical output less than 10 mW is used as the above-mentioned laser light source, it is necessary to expand its radiation area, with the result that the beam spot on the record layer is expanded and hence the energy density thereof is lowered. This will mean that the increase of the power of the semiconductor laser is limited.

As set forth above, since a recording layer of the removing type, which is made of a metal thin film, is insufficient for high speed recording, it has been proposed to use an organic film as the recording layer shown in FIG. 2. In FIG. 2 a base plate 201 is provided with a guide signal hole 206, over which a reflection film 205 is coated, covering the guide signal pit 206. A record layer 202 made of an organic thin film is coated over the reflection film 205. A laser beam 203 which has the guide signal reproduction level intensity within a guide signal region 210, and record level intensity within an information record region 211 to form an information pit 204 is provided.

The above optical record disc is difficult to realize. That is, the organic record layer is made generally in such a manner that a solution containing melted organic substance is coated on a base plate and then its solvent is vaporized. In this case, defects occur when the above solution is charged on the concave pit on the reflection thin film 205 in the guide signal region 210. Defects also occur due to the surface tension of the solution since the surface of the record layer is made flat. The reason is as follows. Since as the absorption ratio of the record layer for the laser beam is high, the record sensitivity of the record layer becomes high, if the guide signal region is formed flat, the intensity of the reflection light i.e. guide signal reproduction light necessary in the guide signal region and the modulation of the light by the guide signal pit are reduced remarkably. As a result, necessary tracking servo can not be operated suitably.

OBJECTS AND SUMMARY OF THE INVENTION

Accordingly, an object of the present invention is to provide a novel optical record disc free from the defects inherent in the prior art.

Another object of the invention is to provide an optical record disc with a guide signal on which information can be recorded at high speed by a low output laser beam.

According to an aspect of the present invention there is provided an optical record disc which comprises:

(a) a base plate having formed thereon a guide signal pit portion and a blank portion along a record track, said guide signal pit portion having a guide signal which is used to set and follow the record track when information is recorded;

(b) a reflection film coated on said base plate; and (c) a record thin layer of a removing type coated on said reflection film on which said information is recorded as an information pit by a laser beam; wherein the polarity of concave and convex of said guide signal pit is selected opposite to that of concave and convex of the information pit recorded on said record thin layer.

The other objects, features and advantages of the present invention will become apparent from the following description taken in conjunction with the accompanying drawings through which the like references designate the same elements and parts.

DESCRIPTION OF THE PREFERRED EMBODIMENTS

The present invention will be hereinafter described with reference to the attached drawings.

Figure 1:
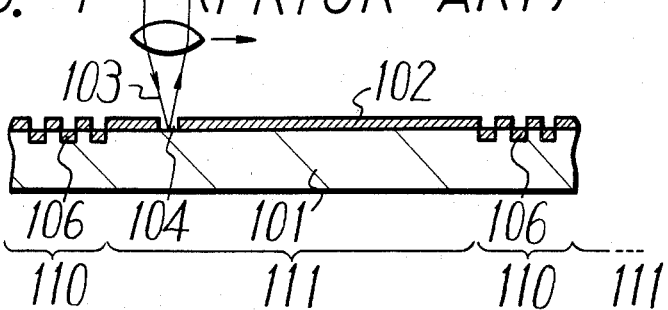
FIG. 1 is a cross-sectional view of a prior art optical record disc with a guide signal along its record track.
Figure 2:
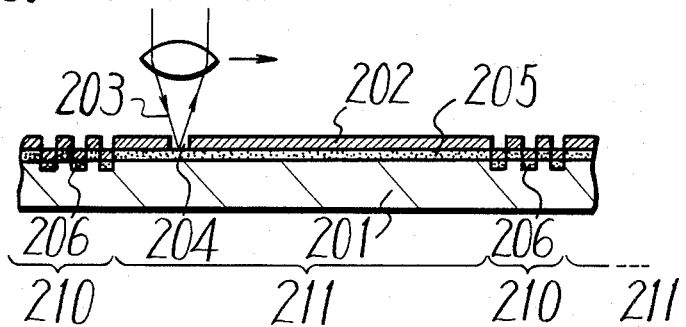
FIG. 2 is a cross-sectional view of another prior art optical record disc with a record layer mode of an organic film along its record track.
Figure 3:
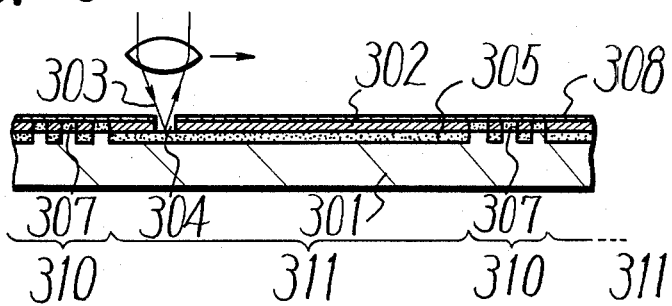
FIG. 3 is a cross-sectional view of an example of the optical record disc with a guide signal according to the present invention along its record track.

FIG. 3 shows in cross-section an example of the optical record disc with a guide signal along its record track. In FIG. 3, a substrate or base plate 301 is provided which is a flat plate of uniform thickness made of high molecular compound because it is required to have a predetermined mechanical strength, planeness and low thermal conductivity. Guide signals of high line 17, amend to read accuracy such as a data synchronizing signal, an address signal and so on are formed on the base plate 31 press forming, injection molding or the like. In this case, the guide signals are formed with opposite polarity to information pits 304 recorded on a record layer 302 by a laser beam 303, which will be described later, or in the projecting direction and used for the base of guide signal pit 307. In order to prevent the passage and diffusion of recording light energy from being transmitted to the base plate 301 and hence to increase the record sensitivity, the base plate 301 is first coated with a metal thin film made of aluminum Al or the like reflection film 305 providing an interference reflection filter. The above-mentioned record layer 302 is formed on the reflection film 305. On the record layer 302 or non-focus surface of the laser light beam 303 there is formed a protective layer 308 which serves to establish low light passage permissibility since the record layer 302 is faded for ultraviolet rays. In FIG. 3, a guide signal region 310 and an information record region 311, respectively is defined.

Figure 4:
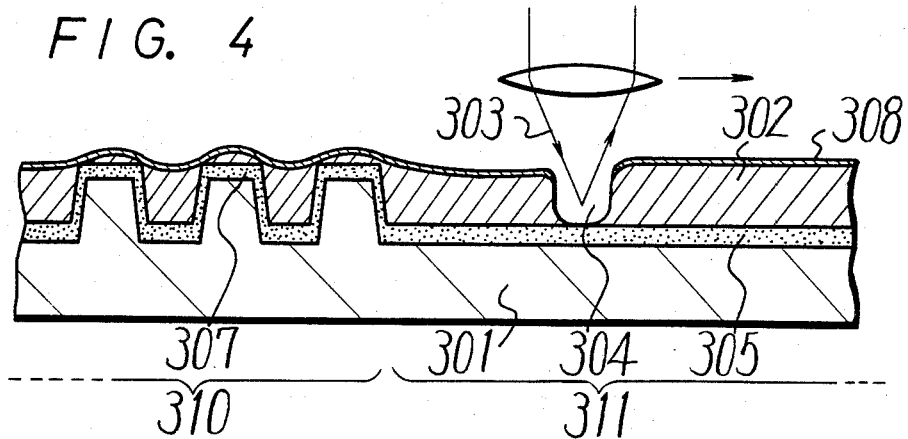
FIG. 4 is a cross-sectional view showing in an enlarged scale a part of FIG. 3.

In the example of the invention shown in FIG. 4 which shows in an enlarged scale a part of FIG. 3, if the record layer 302 is made of an organic layer, it is possible to charge it into the concave portions of the reflection film 305 in the guide signal pit 307 but to avoid coating the convex portions of the guide signal pit 307 or only coating such portions very thinly. Therefore, the strength or intensity modulation of the reproduced light on the guide signal can be sufficiently carried out.

As described above, according to the present invention, there is manufactured an optical record disc with guide signals which consists of the base plate 301 having the guide signal pit 307 opposite in polarity to the information pit 304 and recorded on a record layer 302 of the removing type. The record layer 302 is made of an organic layer, has the high light absorption factor and is formed on the reflection film 305 first coated on the base plate 301. In this case, the light absorption factor can be increased without considering the guide signal pit.

Now, an example of the record layer of the invention will be described which increases the light absorption factor of Nitrocellulose system collodion which is usually low in the absorption factor for the laser light. A solution of collodion, whose main solvent is, for example, Ethyl Alcohol or Ether, is mixed with a solution, which contains Polymethine dye, for example, 1.1'-Diethl-2.2'-Tricarbocyanine iodide dissolved 1 mg per 20 ml of Alcohol, 1:1. This mixture is dropped on a transparent substrate and then dried to form an organic thin film or layer with the thickness of about 0.75 $\mu$m.

Figure 5:
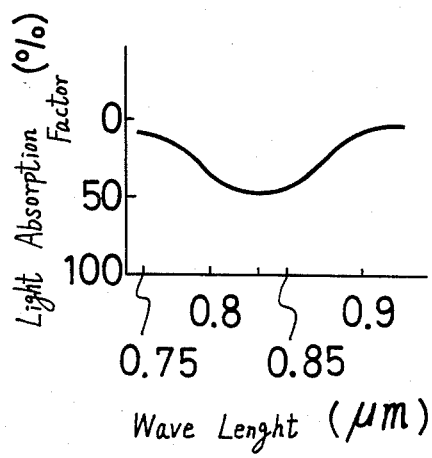
FIG. 5 is a graph showing the light absorption factor versus wave length of the record thin layer of the invention shown in FIGS. 3 and 4.

FIG. 5 is a graph showing the light absorption factor of the above organic layer. The light absorption factor of the organic layer including 5% of the light absorption factor of the substrate is at most 30% for a semiconductor laser with the wave length of 0.83 $\mu$m. Accordingly, the laser beam is absorbed by the organic film or record layer at 50% in going and returning by the help of the effect of the reflection film. Since the specific gravity of the above Nitrocellulose film is 1.67 and the specific heat thereof is 0.03 cal/g.deg, the thickness of the record layer may be selected as 1 $\mu$m, so that this film can be heated to its vaporization temperature 180° C. by input light energy of 3.78 mJ/cm$^2$.

If the light absorption factor of the film containing the dye is 50% in going and returning, input energy necessary to record informations on the record film is 7.56 mJ/cm$^2$. Even if the efficiency of the optical system is 50%, a semiconductor laser can be employed for recording informations on the organic record film because the output of the semiconductor laser is 15.12 mJ/cm$^2$. In general, the radiation area of the semiconductor laser is about 2 $\mu$m$^2$, so that for the information velocity of 10 Mbit/sec the semiconductor laser can be employed since the necessary output thereof is 3 mW.

If the mixing ratio of the collodion solution and dye solution is selected as 1:2, the light absorption factor of an organic record film, similarly made, becomes 50% in one way (going) and 75% in going and returning. Thus, a record layer further high in record sensitivity can be obtained. This record layer is light grey and absorbs the light of rather long wave length.

If iso-Amyl acetate or Butyl acetate is used as the main solvent of the collodion, an organic record layer with the similar effect can be obtained.

Another example of the present invention will be described. 5% of Nitrocellulose using the mixture of solvent having the composition described in column No. 1 of the following table 1 is added with 2% of solution, which is prepared by adding 2 g of Nigrosine dye such as solvent black 7 with 98 g of Ethylene Glycol monomethyl Ether at the ratio of 2:1, to prepare a coating liquid. This liquid has a dye concentration of 0.66% and a Nitrocellulose concentration of 3.3% and in the liquid the ratio of the Nitrocellulose to the dye is 1:5. This liquid is coated on a transparent substrate through a spinner and then dried to form an organic layer with the thickness of 0.75 $\mu$m.

Figure 6:
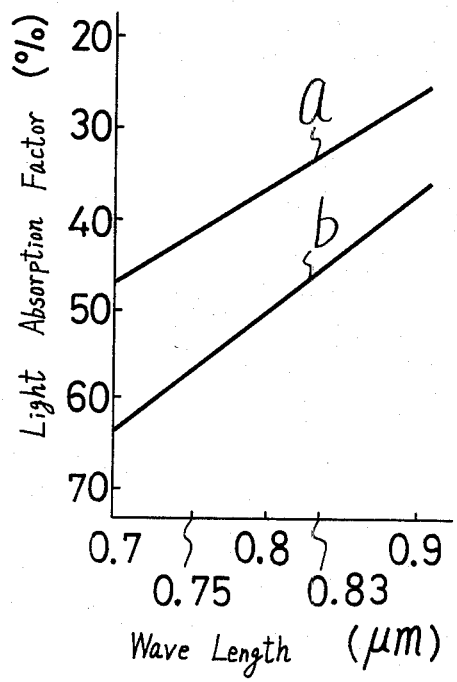
FIG. 6 is a graph showing the light absorption factor of the record thin layer of the invention.

FIG. 6 is a graph in which a curve a shows the light absorption factor of the organic layer mentioned just above. The light absorption factor of this organic layer is 33% for the wave length of 0.83 $\mu$m of a semiconductor laser. Therefore, including the effect of the reflection film, the laser beam is absorbed by the organic layer at about 55% in going and returning. Since the specific gravity of the Nitrocellulose layer is 1.67 and the specific heat thereof is 0.03 cal/g.deg, the input light energy necessary to heat the Nitrocellulose layer with the thickness of 1 $\mu$m up to its vaporization temperature 180° C. is 3.78 mJ/cm$^2$.

If the light absorption factor of the organic record layer owing to the addition of dye is 55% in going and returning, the input energy necessary to record information on the organic record layer is 6.87 mJ/cm$^2$. While, if the light absorption factor of the optical system is 50%, the output of a semiconductor laser is 13.74 mJ/cm$^2$. Therefore, an ordinary semiconductor laser with the radiation area of about 2 $\mu$m$^2$ can be sufficient in use for the recording of information on the record layer since its output light is about 3 mW for the information record velocity of 10 Mbit/sec.

TABLE 1

| (composition table of solvents) | | |
|---|---|---|
| | No. | |
| Kinds of solvents | 1 | 2 |
| Ethyl acetate | 20 g | — |
| n-Butyl acetate | 15 g | 20 g |
| iso-Amyl acetate | 10 g | 15 g |
| Ethyl lactate | — | 10 g |
| Ethylene glycol monomethyl ether | — | 25 g |
| Ethylene glycol monoethyl ether | 25 g | — |
| Methyl iso-Butyl ketone | 10 g | 20 g |
| Diisobutyl ketone | — | 10 g |
| Butanol | 5 g | — |
| Toluene | 15 g | — |

In order to provide an organic record layer with higher record sensitivity, 10% (weight ratio) a solution of Nitrocellulose using the solvents having the composition in No. 2 of the Table 1 is mixed with the above dye solution at the rate of 1:2 to produce a coating liquid (the dye concentration is 1.33%, Nitrocellulose concentration being 3.3%, and the ratio between dye and Nitrocellulose is 1:2.5). Then, this coating liquid being deposited on a transparent substrate in a manner similar to the above-mentioned manner and then dried to provide an organic layer with the thickness of 0.75 μm. The light absorption factor of the layer thus made, for the laser beam with the wave length of 0.83 μm, is 46% as shown by a curve b in the graph of FIG. 6. Therefore, the laser beam is absorbed by the organic layer at about 70% in going and returning including the effect of the reflection film.

As described above, the light absorption factor of the organic layer can be selected by varying the mixing ratio between the dye and the Nitrocellulose. However, if the mixing ratio of the dye with Nitrocellulose is higher than 1:15 or the ratio of the dye becomes higher, the solvent is vaporized and when the layer is formed the dye and Nitrocellulose are separated from each other with the result that the dye is deposited as particles and hence it becomes difficult to provide a uniform layer. While, if the ratio of dye with Nitrocellulose becomes less than 1:10, the light absorption factor of the layer is lowered and accordingly the record sensitivity thereof is also lowered.

Figure 7:
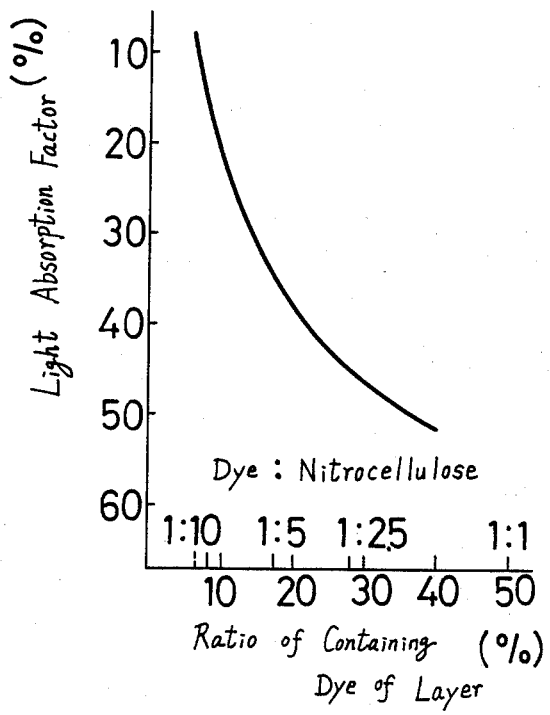
FIG. 7 is a graph showing the light absorption factor of the record thin layer of the invention while the mixing ratio of dye with Nitrocellulose is varied.

FIG. 7 is a graph showing the light absorption factor of organic record layers with the thickness of 0.75 μm while the mixing ratio of the dye with the Nitrocellulose is varied. As will be apparent from the graph of FIG. 7, when the mixing ratio becomes less than 1:10, the light absorption factor of the layer becomes about 10% and the total light absorption factor including the effect of the reflection film is less than 20%, which means that this layer no longer has the function of a record layer. Therefore, the mixing ratio of the dye with the Nitrocellulose is desired within a range from 1:2 to 1:10 and is more preferred within a range from 1:2.5 to 1:5 in consideration of the uniformity of a record layer to be formed and the light absorption factor thereof.

As to the solvent, in addition to these mentioned in the Table 1, the mixture using an Ester group, a ketone group, an Ether group, an Alcohol group and an aromatic group can be utilized. In such cases, however, when the containing ratio of the Alcohol group becomes high, the uniformity of a layer surface deteriorates.

When the coating liquid is deposited on a transparent substrated by a high speed spinner, if the solvent is vaporized during the coating process, the smoothness of a layer deteriorates. Therefore, solvent with high vaporization temperature is desired so as to prevent the solvent from being vaporized during the coating process.

A Nigrosine dye, in place of Solvent.black 7, Solvent.black 5 can be used with the same effect. Further, as the solvent for the dye, not only Ethylene glycol monomethyl ether but also Ethylene glycol monoethyl ether and Ethylene glycol monobutyl ether can be used with the same effect.

As described above, according to the present invention, an optical record disc with guide signals and high in record sensitivity can be provided.

The record layer of the present invention shows color fading property for ultraviolet rays, so that the transmissivity of the protective layer coated on the record layer is lowered for the light of a short wave length to give stability to the record layer.

The above description is given on preferred embodiments of the invention, but it will be apparent that many modifications and variations could be effected by one skilled in the art without departing from the spirits or scope of the novel concepts of the invention, so that the scope of the invention should be determined by the appended claims only.

We claim as our invention:

1. An optical record disc, comprising:
   (a) a base plate having a blank portion of substantially uniform thickness and a guide signal pit portion of projections extending upwardly from one surface of said base plate;
   (b) a light reflecting film layer on said one surface of said base plate coating, said blank portion and said guide signal pit portion; and
   (c) a thin layer of recording material of the removing type coated on said reflection film layer, said recording material having a high light absorption factor, a substantially uniform thickness over said blank portion and a thickness over the top sections of said projections substantially smaller than over said blank portion.

2. An optical record disc as claimed in claim 1, which said record thin layer is made of an organic layer.

3. An optical record disc as claimed in claim 1, in which said record thin layer is made of an organic layer whose light absorption factor for a record light is increased.

4. An optical record disc as claimed in claim 3, in which said record thin layer is made of mixture of Nitrocellulose and Nigrosine dye.

5. An optical record disc as claimed in claim 4, in which a composition ratio of said dye and Nitrocellulose is from 1:2 to 1:10.

6. An optical record disc as claimed in claim 3, in which said record thin layer is made of Nitrocellulose and Polymethine dye.

7. An optical record disc as claimed in claim 1, 2, 3, 4, 5 or 6 in which a light passage permissible protective layer is coated on a non-focus surface of said record thin layer at a light incident side.

8. An optical record disc as claimed in claim 7, in which said protective layer has such a light permissivity which becomes low in a short wave length region.

* * * * *

UNITED STATES PATENT AND TRADEMARK OFFICE
CERTIFICATE OF CORRECTION

PATENT NO. : 4,519,064
DATED : May 21, 1985
INVENTOR(S) : Toshihiko TAKAGI et al It is certified that error appears in the above-identified patent and that said Letters Patent are hereby corrected as shown below:

Column 1, Line 20, Change "record" to --recording--

Column 2, Lines 67-68, Delete "line 17, amend to read"

Column 2, Line 65, change "compount" to --compound--

Column 3, Line 2, before "press" insert --by--

Signed and Sealed this

Eighth Day of October 1985

[SEAL]

Attest:

DONALD J. QUIGG

Attesting Officer

Commissioner of Patents and Trademarks—Designate